US008296530B1

(12) United States Patent (10) Patent No.: US 8,296,530 B1
Prasad et al. (45) Date of Patent: Oct. 23, 2012

(54) METHODS, SYSTEMS, AND COMPUTER READABLE MEDIA FOR OPTIMIZING THE NUMBER OF CLIENT WRITE REQUESTS TO VIRTUALLY PROVISIONED LOGICAL UNITS OF A PHYSICAL DATA STORAGE ARRAY

(75) Inventors: Dipak Prasad, Raleigh, NC (US); Sriram Nagasubramanian, Cary, NC (US); Carson Jeffrey Barker, Apex, NC (US); David W. Harvey, Newton, MA (US); Miles de Forest, Bahama, NC (US); Charles Christopher Bailey, Durham, NC (US)

(73) Assignee: EMC Corporation, Hopkinton, MA (US)

( * ) Notice: Subject to any disclaimer, the term of this patent is extended or adjusted under 35 U.S.C. 154(b) by 1058 days.

(21) Appl. No.: 12/165,032

(22) Filed: Jun. 30, 2008

(51) Int. Cl.
*G06F 12/00* (2006.01)
(52) U.S. Cl. ............. 711/154; 711/114; 711/E12.001
(58) Field of Classification Search .................. None
See application file for complete search history.

(56) References Cited

U.S. PATENT DOCUMENTS

| 5,652,857 | A  | * | 7/1997  | Shimoi et al. | 711/113 |
| 5,724,539 | A  | * | 3/1998  | Riggle et al. | 711/100 |
| 5,875,455 | A  | * | 2/1999  | Ito | 711/113 |
| 6,195,727 | B1 | * | 2/2001  | Islam et al. | 711/114 |
| 2005/0259547 | A1 | * | 11/2005 | Hwang et al. | 369/53.21 |
| 2006/0174156 | A1 | * | 8/2006  | Balasubramanian | 714/6 |
| 2009/0198885 | A1 | * | 8/2009  | Manoj | 711/114 |

* cited by examiner

*Primary Examiner* — Michael Krofcheck
(74) *Attorney, Agent, or Firm* — Jenkins, Wilson, Taylor & Hunt, P.A.

(57) ABSTRACT

According to one aspect, the subject matter described herein includes a method for optimizing the number of data writes to virtually provisioned logical units of a physical data storage array. The method is performed at a virtual provisioning layer associated with a physical storage array and includes receiving, from a client, a first write request for writing data to a first portion of a first data block of a virtually provisioned logical unit (VLUN) of the physical data storage array, wherein the size of the first portion is less than the size of the first data block. In response to receiving the first write request, a combined write request is generated from the virtual provisioning layer, where the combined write request is for writing the first portion of the data from the received write request and a second portion of fill data such that a size of the first portion and the second portion is equal to a size of the first data block. The second write request is then forwarded to the physical layer associated with the data storage array.

14 Claims, 5 Drawing Sheets

METHODS, SYSTEMS, AND COMPUTER READABLE MEDIA FOR OPTIMIZING THE NUMBER OF CLIENT WRITE REQUESTS TO VIRTUALLY PROVISIONED LOGICAL UNITS OF A PHYSICAL DATA STORAGE ARRAY

TECHNICAL FIELD

The subject matter described herein relates to processing write requests to a physical data storage array. More particularly, the subject matter described herein relates to methods, systems, and computer readable media for optimizing the number of client write requests to virtually provisioned logical units of a physical data storage array.

BACKGROUND

In modern computer systems, data may be stored on a physical data storage device, such as a hard disk drive. For example, a user may store data to a 1 terabyte (TB) disk drive that is divided into 512 byte sectors. The size of a disk drive may be determined by its physical characteristics, and the number of sectors it is divided into may be determined by a disk controller at the time of formatting. After formatting, the disk controller may be responsible for receiving and processing write requests to the disk drive for writing data to one or more sectors.

Multiple users may share a single disk drive, while maintaining per-user data segregation, by dividing physical storage into multiple logical disk drives, or partitions. For example, the 1 TB disk drive mentioned above may be divided into two partitions of 0.5 TB each. Each user may be assigned a different 0.5 TB partition. Thus, multiple users may store data to separate logical drives while sharing the same physical storage. This configuration may be a more efficient use of physical storage resources because separate physical drives need not be assigned for each user.

Similarly, a single user may store data on multiple physical disk drives (i.e., a pool of disks) if the user requires more storage capacity than can be provided by a single disk drive or if disk drive redundancy is desired. For example, a storage pool may include five 1 TB disk drives. However, because it may be cumbersome for the user to manage multiple disk drives, physical storage may be abstracted in a variety of ways for representation to the user. Each type and/or level of abstraction of physical storage described below is based on a storage array containing multiple physical data storage devices.

A data storage array (herein also referred to as a "disk storage array", "disk array", or "array") is a collection of hard disk drives operating together logically as a unified storage device in order to simply and flexibly store large quantities of data. Storage arrays are typically managed by one or more storage array processors (SPs) for handling allocation and input/output (I/O) requests. SPs and associated memory may be implemented on blades, which are plugged into slots in one or more shelves. The slots and shelves may be connected together via a communications bus. An exemplary hardware platform for housing a storage array, SPs, memory, and a communications bus is the CLARiiON® platform available from EMC Corporation of Hopkinton, Mass.

As mentioned above, disk arrays may include groups of physical disks that are logically bound together to represent contiguous data storage space to client applications. As used herein, the terms "client", "host" and "application" are used to refer to any application that initiates I/O requests to the storage array. At a first layer of abstraction, multiple disks within a disk array may be combined to form a redundant array of inexpensive disks (RAID) group, which are created by logically binding individual physical disks together to form the RAID groups. RAID groups represent a logically contiguous address space distributed across a set of physical disks and are managed by a RAID controller. Data stored in a RG may be spread across the address space of the RAID group, along with parity information, depending on the RAID configuration or level.

Once multiple physical disks have been combined to form a RG, the RG may then be divided into smaller portions, called "logical units," which may be allocated without regard for the physical division of the storage (i.e., each disk). Applications access and store data incrementally by use of logical storage array partitions, known as logical units (LUs). LUs are made up of collections of storage blocks of a RAID array and are exported from the RAID array for use at the application level. An LU may be identified by a logical unit number (LUN). Therefore, LU and LUN may be used herein interchangeably to refer to a logical unit.

Much like a disk controller is responsible for receiving and processing write requests to a physical disk drive for writing data to one or more sectors, a provisioning layer may be responsible for managing write requests for writing data to a LUN. The provisioning layer may also determine when and how to allocate LUNs from the disk array to a user for storing data to the array.

A first method for provisioning LUNs includes allocating physical storage, before any write requests are received, into fully provisioned LUNs (FLUs). Similar to the partitioning of a single physical disk into multiple logical disk drives, the total size of FLUs provisioned for users may not be greater than the total physical storage available.

For example, an exemplary data storage array may include five 1 TB disk drives combined into a single 5 TB RG. Assuming that a first user needs 3 TB, and each of users 2-5 only need 0.5 TB, fully provisioning the data storage may include dividing the 5 TB RG into one 3 TB FLU and four 0.5 TB FLUs. Thus, user 1 may be presented with a virtualized data storage entity of 3 TB and users 2-5 may be presented with 0.5 TB virtual data storage entities. It is appreciated that at the physical layer, the FLUs may be distributed across a minimum number of disks, may be distributed evenly across all five disks, or may distributed unevenly across any portion of the disks. Moreover, it is possible for the same physical data storage to be shared by multiple users.

A second method for provisioning LUNs includes allocating physical storage at the time data is written. This allows for the possibility of overprovisioning physical storage resources because all that is provisioning need not be allocated, or even physically exist, until it is needed. Overprovisioning of physical storage may be accomplished by further virtualizing LUNs into one or more virtually provisioned LUNs (VLUNs) which allow for over, or "thin," provisioning, of physical storage. As used herein, a VLUN is an abstraction of a disk device for which the underlying physical storage is allocated at the time data is written. Unwritten regions of a VLUN do not have physical storage associated with them and should contain zeroes.

For example, if the 5 TB RG described above were virtually (i.e., thin) provisioned, user 1 may be provisioned a 10 TB VLUN (TLU), and user 2-5 may each be assigned 2 TB VLUNs. Thus, the total amount of virtual data storage may be larger than the total physical data storage capacity (i.e., 18 TB VLUN; 5 TB physical storage). As a result, the mapping between the virtual layer and the physical layer need not be 1:1. In order to correctly store data to physical storage designated in a client write request, a virtual provisioning layer may map between LUNs and VLUNs. For example, the virtual provisioning layer may be located between a client layer and a physical layer and configured to intercept client read and write requests.

Because VLUNs are not allocated physical storage at the time of their creation, physical storage is allocated at the time data is written to a VLUN by an application. Thus, when a write request to a VLUN is received, the virtual provisioning layer may determine whether the sector(s) to be written to are associated with a new block. If so, a new block is allocated. For example, the minimum size of a block that may be allocated by the virtual provisioning layer may be 8 kB. Next, it may be determined whether the sector(s) to be written have a size less than the entire block. If so, fill data may be inserted into the remaining sectors of the block in order to prevent errors in the event that an application read data from one of these sectors. Because this process of determining whether inserting fill data for a newly allocated block in response to receiving a write request to a VLUN is required is typically performed in buffer memory, it may be referred to herein as "buffer expansion."

Buffer expansion is necessary when there is a discrepancy between the minimum allocation of a new block by the virtual provisioning layer and the sector size included in a write request. In other words, because a VLUN is presented to the client as a disk device being divided into 512 byte sectors, much like a physical disk device, write requests are typically directed to 512 byte aligned addresses. However, if the sector(s) to be written require allocation of a new block and would not fill the entire block with data, then the virtual provisioning layer allocates the minimum that it can, which is larger than the amount needed for the data write. The remaining portions of the block not containing data are filled with fill data, such as zeroes, in order to prevent possible errors.

One problem associated with conventional methods for inserting fill data as a result of buffer expansion for a VLUN is that an unnecessary number of separate write requests may be sent to physical storage. Because zerofill and data write requests are separately executed to likely the same physical storage, an unnecessary increase in the number of disk accesses and resources associated with these disk accesses is produced. If an application writes less than 8 kB of data and that data does not begin and end on an integer multiple of an 8 kB boundary, plural write requests must be executed to fill the 8 kB boundary. Moreover, because each disk access may require a certain amount of time for the read/write head to seek out the appropriate physical block on the disk, time and energy is wasted. It is an object of the subject matter described herein to reduce the number of write requests sent to physical storage associated with performing conventional buffer expansion on data writes to VLUNs at a data storage array.

Accordingly, there exists a need for methods, systems, and computer readable medium for optimizing the number of data writes to virtually provisioned logical units of a physical data storage array.

SUMMARY

According to one aspect, the subject matter described herein includes a method for optimizing the number of data writes to virtually provisioned logical units of a physical data storage array. The method is performed at a virtual provisioning layer associated with a physical storage array and includes receiving, from a client, a first write request for writing data to a first portion of a first data block of a virtually provisioned logical unit (VLUN) of the physical data storage array, wherein the size of the first portion is less than the size of the first data block. In response to receiving the first write request, a combined write request is generated from the virtual provisioning layer, where the combined write request is for writing the first portion of the data from the received write request and a second portion of fill data such that a size of the first portion and the second portion is equal to a size of the first data block. The second write request is then forwarded to the physical layer associated with the data storage array.

According to another aspect, a system for optimizing the number of data writes to virtually provisioned logical units of a physical data storage array is disclosed. The system includes a data storage array for storing data for at least one client. A virtual provisioning layer associated with the data storage array is configured to receive, from a client at a virtual provisioning layer associated with a physical storage array, a first write request for writing data to a first portion of a first data block of a virtually provisioned logical unit (VLUN) of the physical data storage array, wherein the size of the first portion is less than the size of the first data block. The virtual provisioning layer is further configured to generate, in response to receiving the first write request and from the virtual provisioning layer, a combined write request for writing the first portion of the data from the received write request and a second portion of fill data such that a size of the first portion and the second portion is equal to a size of the first data block. The virtual provisioning layer forwards the second write request to the physical layer associated with the data storage array.

The subject matter described herein for optimizing the number of data writes to virtually provisioned logical units of a physical data storage array may be implemented in hardware, software, firmware, or any combination thereof. As such, the terms "function" or "module" as used herein refer to hardware, software, and/or firmware for implementing the feature being described. In one exemplary implementation, the subject matter described herein may be implemented using a computer readable medium having stored thereon computer executable instructions that when executed by the processor of a computer perform steps.

Exemplary computer readable media suitable for implementing the subject matter described herein include disk memory devices, chip memory devices, programmable logic devices, and application specific integrated circuits. In addition, a computer program product that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings, wherein like reference numerals represent like parts, of which.

DETAILED DESCRIPTION

Figure 1:
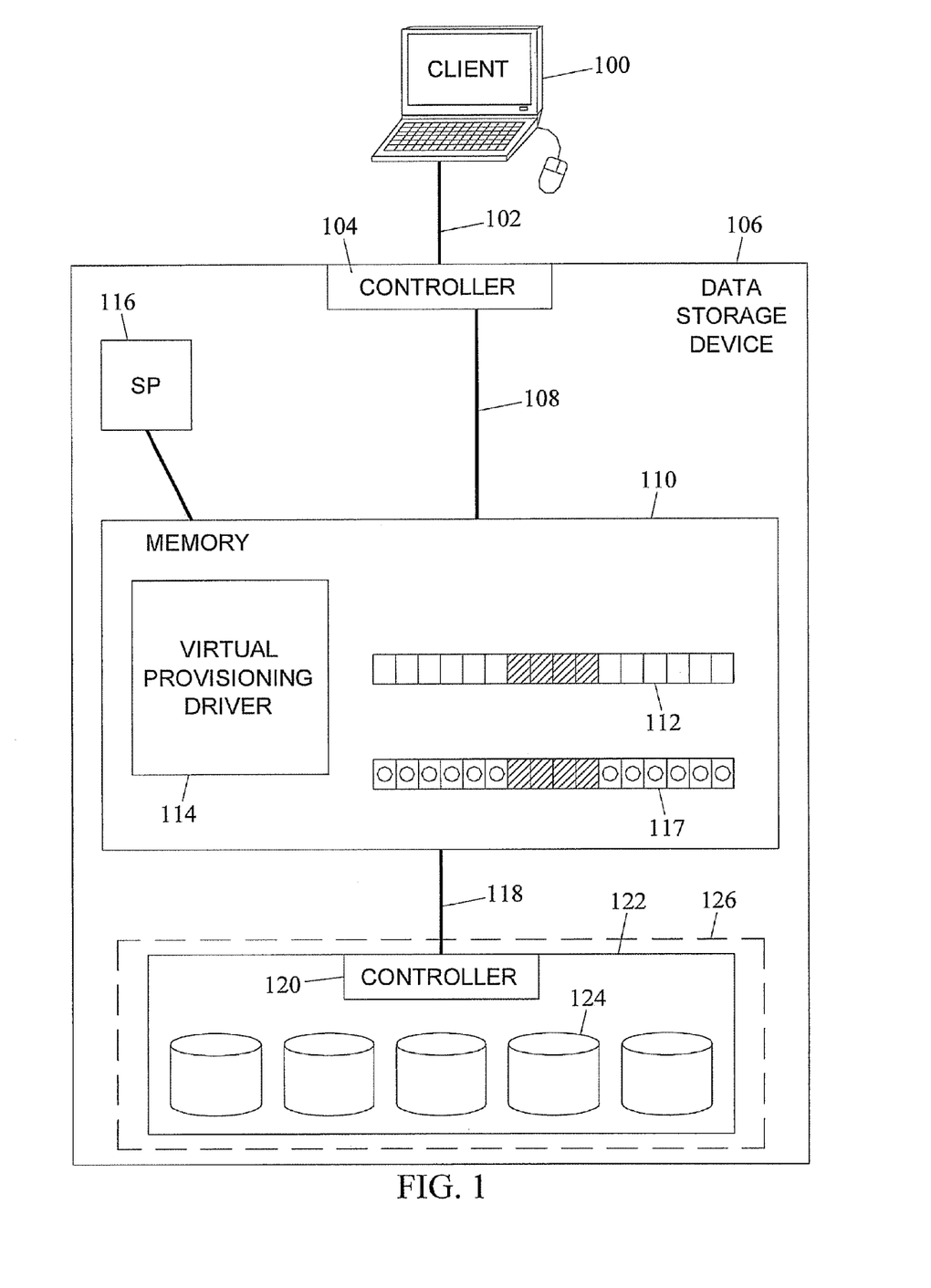
FIG. 1 is an exemplary data storage device for optimizing the number of data writes to virtually provisioned logical units of a physical data storage array according to an embodiment of the subject matter described herein.

FIG. 1 is an exemplary data storage device for optimizing the number of data writes to virtually provisioned logical units of a physical data storage array according to an embodiment of the subject matter described herein. Referring to FIG. 1, client 100 may be connected via communications channel 102 to a client controller 104 on data storage array 106. Client 100 may include a computer and/or a software application configured to generate input/output (I/O) requests for writing or reading data on data storage array 106.

For example, a write request may be received from client 100 at controller 104 and temporarily stored in memory 110. In the embodiment shown in FIG. 1, write request 112 may include a request to write data to the middle 2 kB of an 8 kB block. For example, write request 112 may include a request to write data to sectors 7-10 of a 16-sector block, wherein each sector is 512 bytes. However, it is appreciated that a variety of sector and/or block sizes may be used without departing from the scope of the subject matter described herein. It is further appreciated that because write request 112 is directed to a virtually provisioned logical unit, write request 112 may be processed by virtual provisioning driver 114.

Virtual provisioning driver 114 may include a layered software driver stored in memory 110 and executed by one or more storage processors (SPs) 116 for handling I/O requests and allocations. SP 116 may communicate with memory 110 in order to manage the storage and processing of I/O requests received from client 100. It is appreciated that while a single SP 116 is shown in FIG. 1, multiple storage processors 116 may be included in data storage device 106 without departing from the scope of the subject matter described herein. One responsibility of virtual provisioning driver 114 may include performing buffer expansion for received data write requests. Buffer expansion may include writing fill data to the sectors in a newly allocated block of a VLUN when the data write request is for writing data to a portion of the block that is less than the size of an entire block.

An example of buffer expansion is shown in FIG. 1 wherein data write 112 is for writing 2 kB of an 8 kB block, thereby requiring 6 kB of buffer expansion. This process may be referred to as buffer expansion because it is performed in buffer memory 110 prior to sending the write request to physical storage. In one embodiment, virtual provisioning driver 114 may generate expanded write request 117 by inserting fill data in the first 3 kB and last 3 kB sectors of the 8 kB write request block. As shown in FIG. 1, expanded write request 117 includes fill data that includes logical zeroes.

After performing buffer expansion, write request 117 may be sent to physical storage for execution. For example, memory 110 may be connected to storage device controller 120 via communications bus 118. In one embodiment, communications bus 118 may include a serial advanced technology attachment (SATA) bus. However, communications bus 118 may include any suitable communications bus for interfacing with data storage devices 124 including, but not limited to, external SATA (eSATA), parallel ATA (PATA), universal serial bus (USB), FireWire™, and Fibre Channel, without departing from the scope of the subject matter described herein.

Storage array 106 may include multiple storage devices 124, which are typically hard disk drives, but which may be tape drives, flash memory, flash drives, other solid state drives, or some combination of the above. In one embodiment, storage devices 124 may be organized into multiple shelves, each shelf containing multiple devices. In the embodiment illustrated in FIG. 1, storage devices 124 are located in a single shelf having five disk storage devices connected to disk controller 120 via a shared communications bus (not shown).

In addition to the physical configuration, storage devices 124 may also be logically configured as storage array 122. For example, multiple storage devices 124 may be organized into redundant array of inexpensive disks (RAID) group (RG) 122. It is appreciated that a RAID group may be located on the same shelve and/or the same bus, or may span multiple shelves and/or multiple buses without departing from the scope of the subject matter described herein. Although RAID groups are composed of multiple storage devices, a RAID group may be conceptually treated as if it were a single storage device. A RG may be further sub-divided into logical units (LUs).

VLUNs 126 represents a logically contiguously view of a RAID array 122, and as such, provides a mapping of logical units on to RAID array 122. In one embodiment, SP 116 may be responsible for allocating storage and maintaining information about how allocated storage is used. SP 106 may maintain information about the structure of the file system whose contents are being stored in allocated slices. An exemplary process for optimizing the number of data writes to virtually provisioned logical units of a physical data storage array will now be described in greater detail below with respect to FIG. 2.

Figure 2:
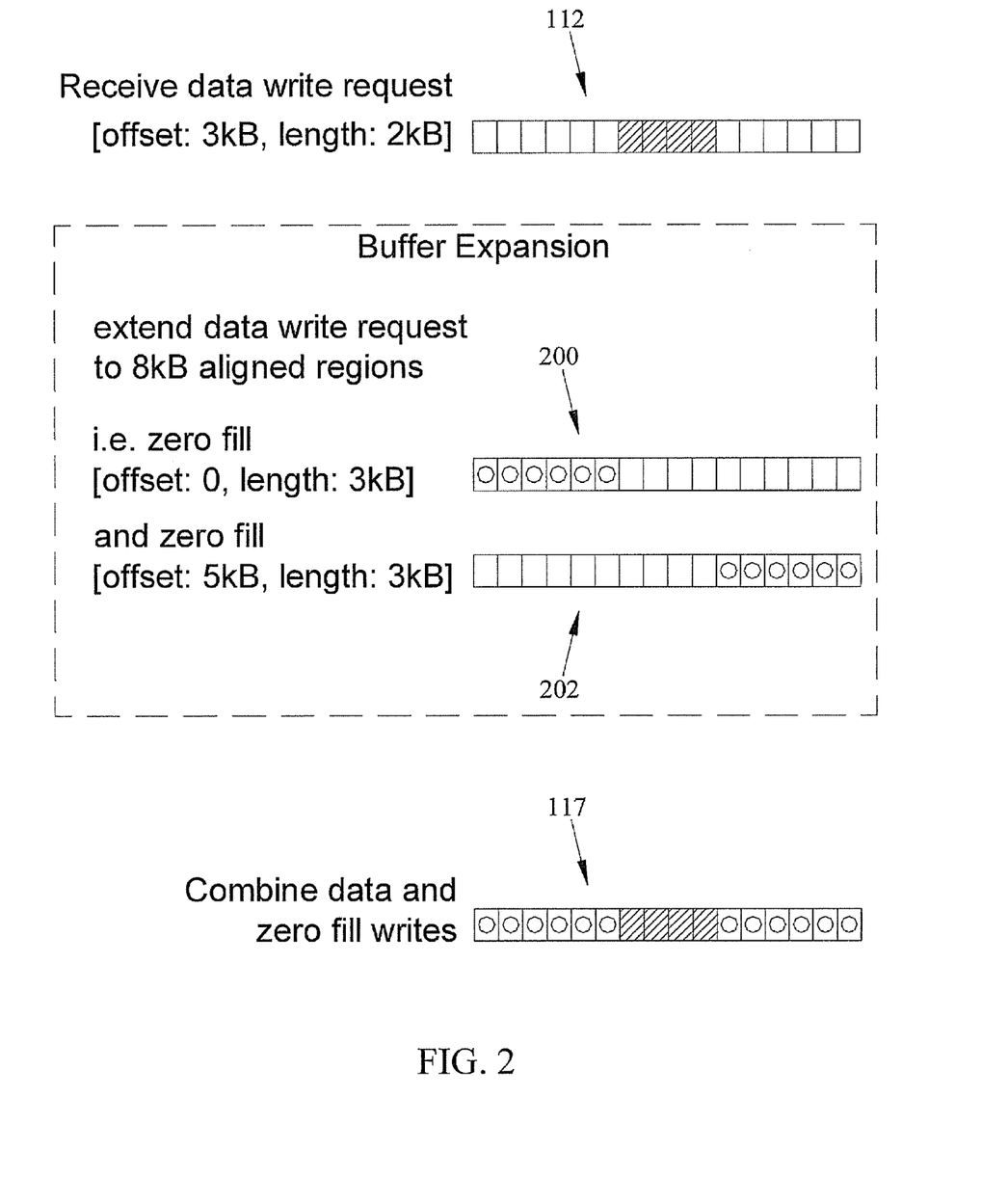
FIG. 2 is a diagram illustrating a process of buffer expansion for a client write request for optimizing the number of data writes to virtually provisioned logical units of a physical data storage array according to an embodiment of the subject matter described herein.

FIG. 2 is a diagram illustrating an exemplary buffer expansion process for a client write request for optimizing the number of data writes to virtually provisioned logical units of a physical data storage array according to an embodiment of the subject matter described herein. Referring to FIG. 2, data write request 112 may be received at virtual provisioning driver 114 of data storage device 106, where data write request 112 is defined by the tuple [6,4] having the format [offset, length]. Thus, data write request 112 indicates a request to write data into the middle 2 kB of an 8 kB block. In the embodiment shown in FIG. 2, the 8 kB block is divided into sixteen 512 byte sectors. However, other block and sector sizes may be used without departing from the scope of the subject matter described herein.

Once data write request 112 is received, it is determined whether buffer expansion is required. Buffer expansion is the process of adding fill data, such as zeroes, to the remaining sectors in a newly allocated data block so that when data associated with data write request 112 is written to the physical storage array, all sectors in the block will contain either the requested data or the fill data (i.e. zeroes).

Because data write request 112 is associated with writing data to sectors in the "middle" of a logical block, a first and a second zerofill data may be generated during buffer expansion. For example, zerofill data 200 may include writing fill data (zeroes) to the first 3 kB of the block, and zerofill data 202 may include writing logical zeros to the last 3 kB of the block. This may be expressed as an offset of 0 and a length of 6, and an offset of 10 and a length of 6, respectively. However, in other embodiments, only one zerofill data may need to be generated in order to fill a logical block. For example, a single leading zerofill data may be generated when a client write request is directed to the last one or more contiguous sectors in a block. Alternatively, a single trailing zerofill data may be generated when a client write request is directed to the first one or more contiguous sectors in the block.

It is appreciated that zerofill data 200 and 202 may be generated by SP 116 by manipulation of memory 110 which may be logically distinct but not include physically contiguous memory locations. Further, zerofill data 200 and 202 may be said to not "exist" until they are executed to physical storage as individual write requests. In other words, zerofill data 200 and 202 may be differentiated from data write request 112 in that data write request 112 originates from and is received from client 100, while zerofill data 200 and 202 are created by virtual provisioning driver 114 in response to determining that buffer expansion is required.

Thus, using conventional methods, in response to receiving a write request directed to a virtually provisioned logical unit, a new block may be provisioned by a virtual provisioning layer. However, after provisioning an entire block, it may be determined that the data to be written is less than the entire block. If so, in order to prevent possible errors, buffer expansion may be performed on the received data write request for writing fill data to the remaining portions of the block. Conventionally, buffer expansion includes sending separate write requests to physical storage, one for writing data to a first portion of the newly allocated block and at least a second zerofill write request for writing zerofill data to at least a second portion of the block.

In the example shown in FIG. 2, write request 112 may be buffer expanded in order to fill the first 3 kB and the last 3 kB of the 8 kB block. Using conventional methods, three separate write requests 112, 200, and 202 may be executed to physical storage controller 120. In contrast, according to the method described herein, write request 112 is combined with the fill data 200 and 202, while stored in memory 110 and before being sent to physical storage 120, in order to create a single combined write request 117.

Because write requests 112, 200, and 202 are directed to the same logical 8 kB block, whether sent separately to physical storage or combined as a single write request, it is likely that they would be written to the same physical disk 124. As a result, one disadvantage to using conventional methods wherein zerofill and data write requests are separately executed to likely the same physical storage includes an unnecessary increase in the number of disk accesses and resources associated with these disk accesses. Moreover, because each disk access may require a certain amount of time for the read/write head to seek out the appropriate physical block on the disk, time and energy is wasted.

In contrast, the subject matter described herein includes generating a combined write request 117 for writing a first portion of data included in data write request 112 and a second portion of fill data corresponding to zerofill data 200 and 202 such that the size of combined write request 117 is equal to a size of a complete data block (i.e., 8 kB). As a result of combining data and zerofill data 112, 200 and 202 in memory 110 prior to being sent to physical storage controller 120, the number of disk accesses is reduced. Thus, overall system performance may benefit due to the decreased number of resources allocated to processing multiple I/O requests.

Figure 3:
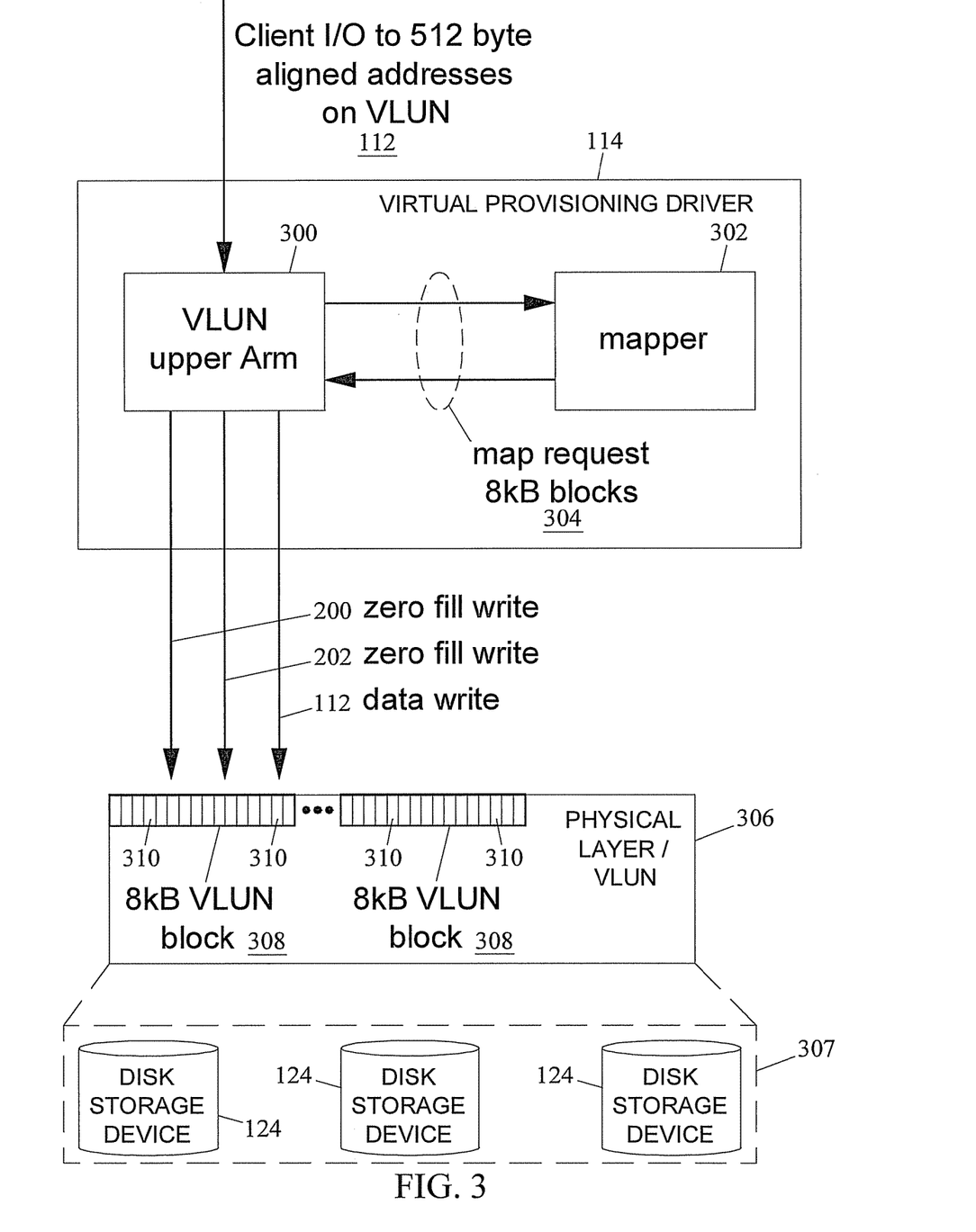
FIG. 3 is a diagram illustrating a conventional process of writing multiple write requests to a physical data storage array after buffer expansion for optimizing the number of data writes to virtually provisioned logical units of a physical data storage array according to an embodiment of the subject matter described herein.

FIG. 3 is a diagram further illustrating a conventional process of writing multiple write requests to a physical data storage array after buffer expansion. Referring to FIG. 3, disk storage devices 124 may be formed into a RAID group 307. RG 307 may be logically represented as a plurality of VLUNs 306 to virtual provisioning driver 114. For example, when virtual provisioning driver 114 sends write requests to disk storage devices 124 to be written, the details of disk devices 124 are hidden from virtual provisioning driver 114. Rather, disk devices 124 are abstracted and represented to virtual provisioning driver 114 as physical layer containing a flat array of VLUNs.

For example, physical layer 306 may include VLUN block 308 having a length of 8 kB. Each VLUN block 308 may be logically divided into 16 individual 512 byte sectors 310. The granularity of the mapping provided by virtual provisioning driver 114 is 8 kB, whereas the VLUN is a 512 byte sector-based disk device and therefore must service client I/Os on 512 byte aligned addresses. This disparity in block size (i.e., 512b vs. 8 kB) causes virtual provisioning driver 114 to extend client write requests to 8 kB aligned regions by filling the portions of the extended write for which there is no client data with fill data.

Virtual provisioning driver 114 may be divided into multiple layers for performing different functions. For example, virtual provisioning driver 114 may include VLUN upper arm 300 and VLUN mapper 302. VLUN upper arm 300 may handle all specific device handling functions for virtual provisioning driver 114. In other words, VLUN devices may be 'exported' by virtual provisioning driver 114 via VLUN upper arm 300. VLUN upper arm 300 thus exposes functional interfaces that are to be used by the client. The primary interface is used by the client to perform I/O reads and writes to the VLUN. Upon receiving a client I/O request, VLUN upper arm 300 may perform validity checks for the I/O request and contact VLUN mapper 302 in order to obtain a mapping of the VLUN to the physical storage devices. Given the mapping, VLUN upper arm 300 may then create an I/O request that is sent to the physical device or devices that will satisfy the client's original I/O request. VLUN mapper 302 may be the component of virtual provisioning driver 114 that maps the physical storage device extents to the VLUN virtual space. VLUN mapper 302 may expose a file abstraction for the VLUN where the file is an aggregation of physical storage device offsets and lengths that make up the VLUN.

Thus, client write request 112 is received by VLUN upper arm 300 of virtual provisioning driver 114. In step 304, VLUN upper arm 300 may request a mapping of the 512 byte aligned sectors included in write request 112 to 8 kB VLUN blocks 308 from mapper 302. Upon receiving the mapping, VLUN upper arm 300 may determine that zerofill data 200 and 202 are required. Lastly, separate data and zerofill data requests 112, 200 and 202 may be sent to physical layer 306. As described above, sending multiple write requests which are likely directed to the same physical storage may result in an unnecessary waste of system resources and slower overall performance. An embodiment that avoids these disadvantages by optimizing the number of data writes to virtually provisioned logical units of a physical data storage array will be described in greater detail below with respect to FIG. 4.

Figure 4:
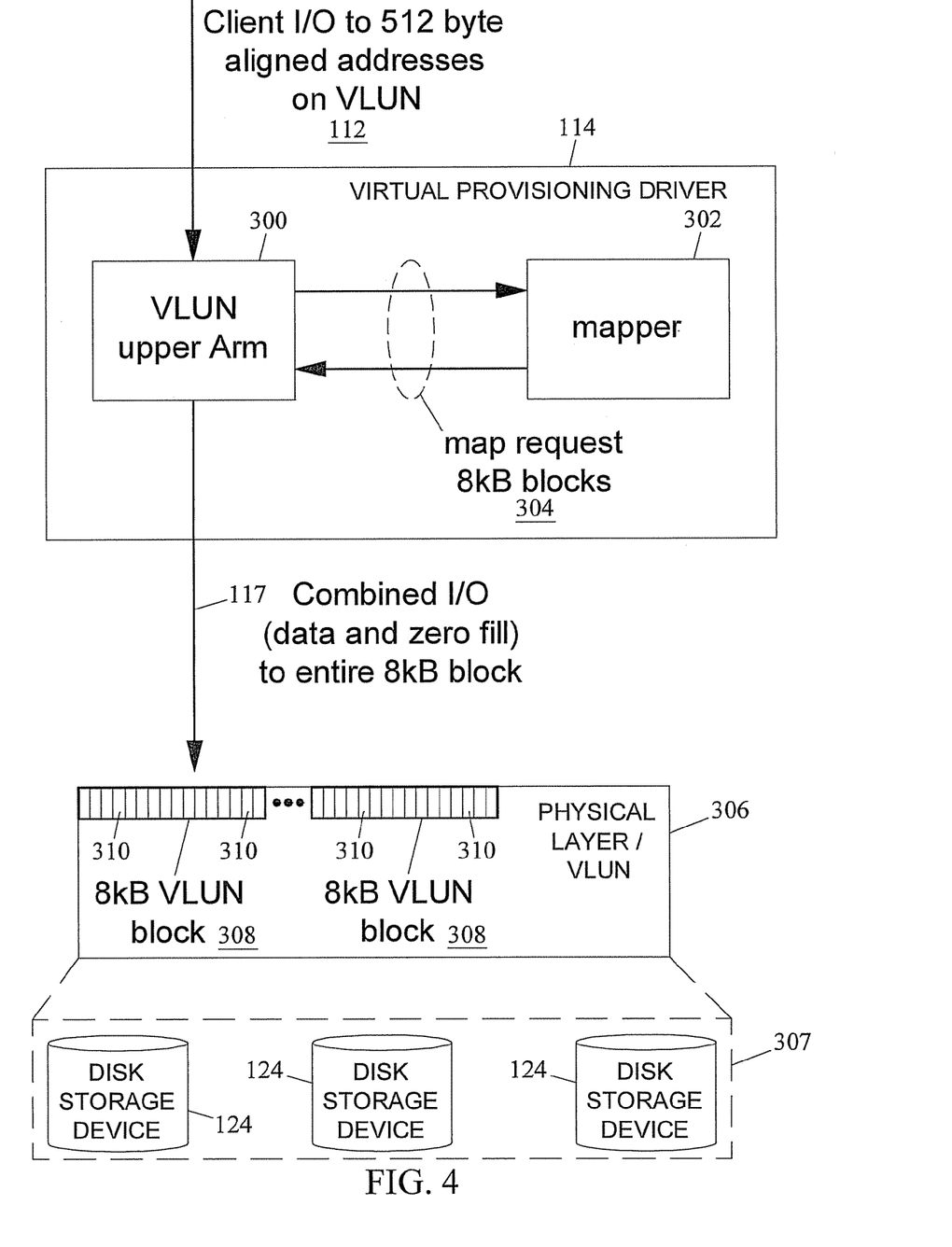
FIG. 4 is a diagram illustrating a process of combining a data write request with fill data into a single combined write request to a physical data storage array for optimizing the number of data writes to virtually provisioned logical units of a physical data storage array according to an embodiment of the subject matter described herein.

FIG. 4 is a diagram illustrating a process of combining a data write request with fill data into a single combined write request to a physical data storage array for optimizing the number of data writes to virtually provisioned logical units of a physical data storage array according to an embodiment of the subject matter described herein. Referring to FIG. 4, client write request 112 may be received by VLUN upper arm 300 of virtual provisioning driver 114. In step 304, VLUN upper arm 300 may request a mapping of the 512 byte aligned sectors included in write request 112 to 8 kB VLUN blocks 308 from mapper 302. Upon receiving the mapping, VLUN upper arm 300 may determine that zerofill data 200 and 202 are required.

However, in contrast to conventional methods, separate data and zerofill data requests 112, 200 and 202 are not sent to physical layer 306. Rather, VLUN upper arm 300 may generate combined write request 117 that includes both zerofill and data portions such that the size of combined write request 117 is equal to the minimum granularity of the VLUN mapping provided by mapper 302 (i.e., 8 kB). A single combined write request 117 may then be forwarded to physical layer 306 for execution. As a result, the number of disk accesses may be reduced and the overall system performance may be increased.

Figure 5:
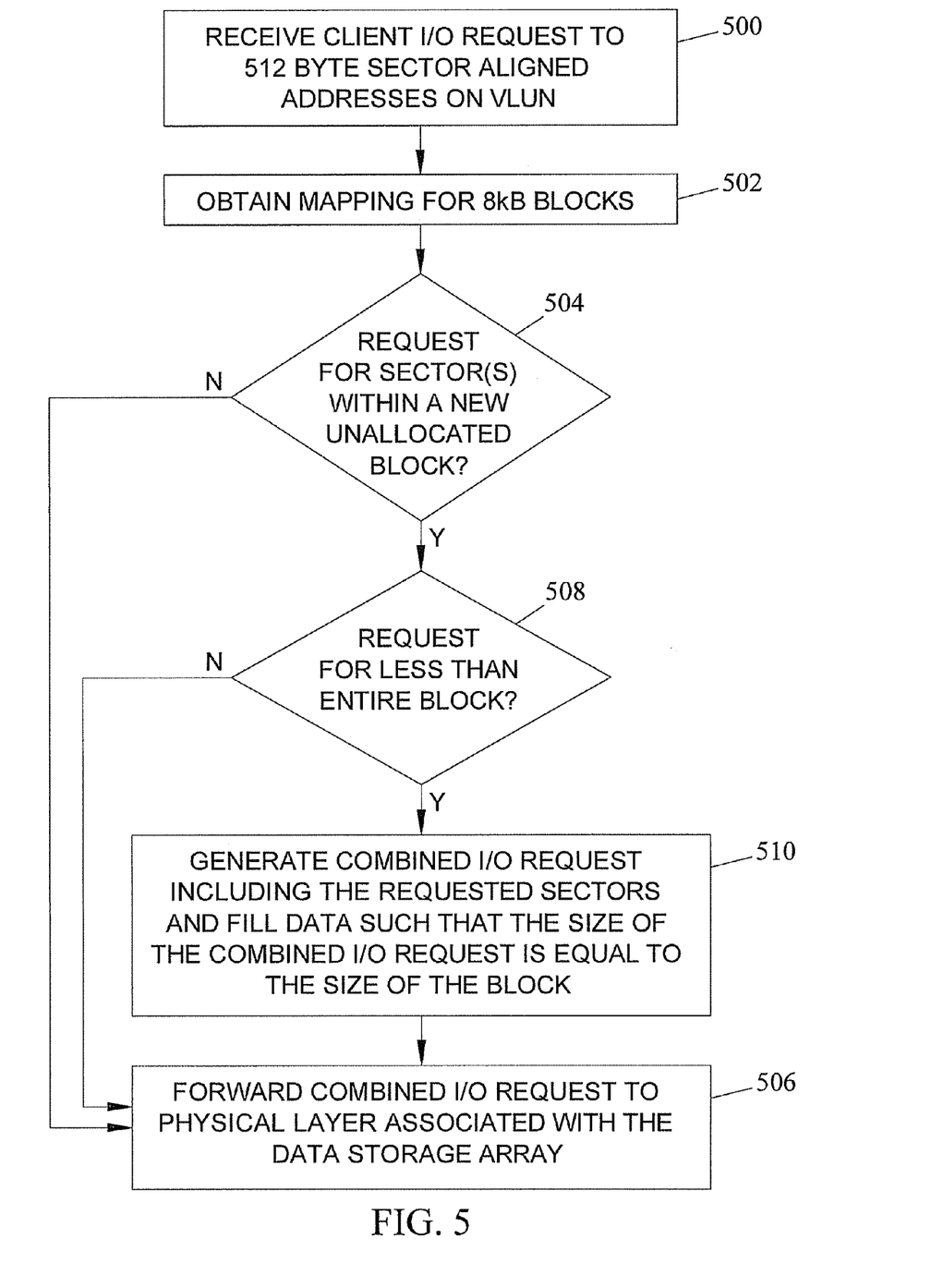
FIG. 5 is a flow chart of exemplary steps for optimizing the number of data writes to virtually provisioned logical units of a physical data storage array according to an embodiment of the subject matter described herein.

FIG. 5 is a flow chart of exemplary steps for optimizing the number of data writes to virtually provisioned logical units of a physical data storage array according to an embodiment of the subject matter described herein. Referring to FIG. 5, in step 500, a client I/O request is received, where the I/O request is directed to one or more 512 byte sector aligned addresses on a VLUN. For example, data write request 112 may be received by virtual provisioning driver 114 from client 100. Because disk storage devices 124 may be presented as a 512 byte sector-based disk device, they must service client I/Os on 512 byte aligned addresses. However, the abstraction of RAID array 307 into TLUs may provide a different (and larger) minimum level of granularity. Therefore, a mapping may be required between different block sizes.

In step 502, a mapping is obtained for 8 kB blocks. For example, a first layer of virtual provisioning driver 114 (i.e., VLUN upper arm 300) may request a mapping from a second layer of virtual provisioning driver 114 (i.e., mapper 302). In one embodiment, this mapping may be a scatter gather list.

As used herein, a scatter gather list (SGL) refers to an abstract data type for mapping a logical sequence of first memory locations to one or more destination locations, wherein the mapping may be used for writing data to one or more noncontiguous destination locations (i.e., "scattering") or for reading from the one or more noncontiguous destination locations (i.e., "gathering"). For example, an SGL may include a list of tuples, each tuple containing a physical address, a length (ordinarily in bytes) and, optionally, a device identifier. The SGL indicates the regions of memory to or from which data should be transferred. The logical sequence of main memory locations listed in the SGL need not be consecutive (i.e., they may be scattered).

The typical sequence is for the OS to make a request of the driver to transfer so many bytes from such-and-such a virtual address to or from such-and-such a logical block address (LBA) on a disk device. The driver takes this virtual address and computes (in an OS/hardware dependent way) the physical addresses and lengths that the virtual address maps to (the "scatter gather list"), and constructs a "command" containing this scatter gather list. Typically the physical address of this command is then written out to a memory mapped register on the device. This typically causes the device to read the command from client memory, and perform the read or write using the scatter gather list.

In step 504, it is determined whether the sector(s) in the I/O request are for a new block, where a new block is a block that has not yet been allocated by the virtual provisioning driver. For example, if the requested sector(s) are directed to an existing block, buffer expansion is unnecessary, and therefore the need to optimize the number of write requests to physical storage by combining zerofill and data writes is obviated. It is appreciated that once a block has been allocated by virtual provisioning driver 114, which occurs in response to receiving a data write request if the write request is directed to a VLUN, the block will contain either data in the sector(s) indicated by the write request or fill data resulting from buffer expansion (whether conventionally performed or performed according to the subject matter described herein). Thus, subsequent write requests for writing data to sectors within a previously allocated block do not require buffer expansion and therefore are not relevant to the method for optimizing the number of zerofill and data writes to physical storage described herein. In other words, if a block has already been allocated at the time a write request for that block is received, data sectors having a size less than the minimum mapping granularity provided by mapper 302 may be written directly to those sectors without writing to other sectors within the block.

In block 506, the combined write request is forwarded to a physical layer associated with the data storage array.

Returning to step 504, if VLUN upper arm 300 determines that the requested sector(s) are directed to a new (i.e., unallocated) block, control proceeds to step 508.

In step 508, it is determined whether the total size of the sector(s) in the I/O request is equal to the size of an entire block. For example, if a data write request is received for zero offset and 16 contiguous 512 byte sectors, then the data write request would fill an entire 8 kB block exactly.

In step 510, a combined I/O request is generated that includes the requested data sector(s) from the client request and fill data, wherein the size of the combined I/O request is equal to the size of a data block. For example, continuing the example described above, data write request 112 for the middle 2 kB of an 8 kB block (i.e., sectors 7-10) may result in the generation of first zerofill data associated with sectors 1-6 and second zerofill data associated with sectors 11-16.

In accordance with the subject matter disclosed herein, systems, methods, and computer readable medium are provided for optimizing the number of data writes to virtually provisioned logical units of a physical data storage array. It will be understood that various details of the subject matter described herein may be changed without departing from the scope of the subject matter described herein. Furthermore, the foregoing description is for the purpose of illustration only, and not for the purpose of limitation.

What is claimed is:

1. A method for optimizing the number of data writes to virtually provisioned logical units of a physical data storage array, the method comprising:
  at a virtual provisioning layer associated with a physical storage array:
    receiving, from a client, a first write request for writing data to a first portion of a first data block of a virtually provisioned logical unit (VLUN) of the physical data storage array, wherein the size of the first portion is less than the size of the first data block;
    in response to receiving the first write request, generating, from the virtual provisioning layer, a second write request for writing the first portion of the data from the received first write request and at least one second portion of fill data generated by the virtual provisioning layer such that a size of the first portion and the at least one second portion is equal to a size of the first data block; and
    forwarding the second write request to the physical layer associated with the data storage array.

2. The method of claim 1 comprising executing the second write request, wherein executing the second write request includes writing the first data block to physical storage.

3. The method of claim 1 wherein generating the second write request includes obtaining a scatter gather list (SGL) for determining a location of the first portion of the first data block.

4. The method of claim 1 wherein the first write request requests writing of the first data from a beginning to an intermediate portion of the first data block and wherein generating the second write request includes generating a single write request for writing the first portion of data from the beginning to the intermediate portion of the first data block and for writing the at least one second portion of data from the intermediate portion to the end of the first data block.

5. The method of claim 1 wherein the first write request requests writing of the first data from an intermediate portion to the end of the first data block and wherein generating the second write request includes generating a single write request for writing the first portion of data from the intermediate portion to the end of the first data block and for writing the at least one second portion of data from the beginning to the intermediate portion of the first data block.

6. The method of claim 1 wherein the first write request requests writing of the first data from a first intermediate portion to a second intermediate portion of the first data block and wherein generating the second write request includes generating a single write request for writing the first portion of data from the first intermediate portion to the second intermediate portion of the first data block and for writing the at least one second portion of data from the beginning to the first intermediate portion and from the second intermediate portion to the end of the first data block.

7. The method of claim 1 wherein the first write request requests writing of the first data from a beginning to an intermediate portion of the first data block and wherein the virtual provisioning layer is configured to generate the second write request for writing the first portion of data from the beginning to the intermediate portion of the first data block and for writing the at least one second portion of data from the intermediate portion to the end of the first data block.

8. The method of claim 1 wherein the first write request requests writing of the first data from an intermediate portion to the end of the first data block and wherein the virtual provisioning layer is configured to generate the second write request for writing the first portion of data from the intermediate portion to the end of the first data block and for writing the at least one second portion of data from the beginning to the intermediate portion of the first data block.

9. The method of claim 1 wherein the first write request requests writing of the first data from a first intermediate portion to a second intermediate portion of the first data block and wherein the virtual provisioning layer is configured to generate the second write request for writing the first portion of data from the first intermediate portion to the second intermediate portion of the first data block and for writing the at least one second portion of data from the beginning to the first intermediate portion and from the second intermediate portion to the end of the first data block.

10. A system for optimizing the number of data writes to virtually provisioned logical units of a physical data storage array, the system comprising:
a data storage array for storing data for at least one client; and
a virtual provisioning layer associated with the data storage array for:
receiving, from a client at a virtual provisioning layer associated with a physical storage array, a first write request for writing data to a first portion of a first data block of a virtually provisioned logical unit (VLUN) of the physical data storage array, wherein the size of the first portion is less than the size of the first data block;
in response to receiving the first write request, generating, from the virtual provisioning layer, a second write request for writing the first portion of the data from the received write request and a second portion of fill data generated by the virtual provisioning layer such that a size of the first portion and the second portion is equal to a size of the first data block; and
forwarding the second write request to the physical layer associated with the data storage array.

11. The system of claim 10 comprising a physical layer for executing the second write request, wherein executing the second write request includes writing the first data block to physical storage.

12. The system of claim 10 wherein the virtual provisioning layer is configured to obtain a scatter gather list (SGL) for determining a location of the first portion of the first data block.

13. The system of claim 10 wherein the virtual provisioning layer is configured to generate the second write request including zerofill data for writing zeroes to the second portion of the first data block.

14. A non-transitory computer readable medium having stored thereon computer executable instructions that when executed by the processor of a computer perform steps comprising:
at a virtual provisioning layer associated with a physical storage array:
receiving, from a client, a first write request for writing data to a first portion of a first data block of a virtually provisioned logical unit (VLUN) of the physical data storage array, wherein the size of the first portion is less than the size of the first data block;
in response to receiving the first write request, generating, from the virtual provisioning layer, a second write request for writing the first portion of the data from the received write request and at least one second portion of fill data generated by the virtual provisioning layer such that a size of the first portion and the at least one second portion is equal to a size of the first data block; and
forwarding the second write request to the physical layer associated with the data storage array.

* * * * *